United States Patent
Hung et al.

(10) Patent No.: US 8,488,732 B2
(45) Date of Patent: *Jul. 16, 2013

(54) COMMUNICATION RECEIVER AND A RECEIVING METHOD

(75) Inventors: Cheng-Hsi Hung, Tainan (TW); Shiang-Lun Kao, Tainan (TW)

(73) Assignee: Himax Media Solutions, Inc., Sinshih Township, Tainan County (TW)

( * ) Notice: Subject to any disclaimer, the term of this patent is extended or adjusted under 35 U.S.C. 154(b) by 281 days.

This patent is subject to a terminal disclaimer.

(21) Appl. No.: 12/984,844

(22) Filed: Jan. 5, 2011

(65) Prior Publication Data

US 2012/0170693 A1 Jul. 5, 2012

(51) Int. Cl.
*H04L 7/02* (2006.01)

(52) U.S. Cl.
USPC ........... 375/361; 375/360; 375/317; 375/333; 375/282; 269/47; 269/28; 370/503; 370/509

(58) Field of Classification Search
USPC .......... 375/361, 360, 317, 333, 282; 370/503, 370/509; 269/47.28
See application file for complete search history.

(56) References Cited

U.S. PATENT DOCUMENTS

| 5,040,193 A * | 8/1991 | Leonowich et al. ......... 375/333 |
| 6,389,548 B1 * | 5/2002 | Bowles ......................... 713/500 |
| 7,450,666 B2 * | 11/2008 | Miyanaga et al. ............ 375/333 |
| 8,000,193 B1 * | 8/2011 | Liu et al. ..................... 369/47.28 |
| 8,132,037 B2 * | 3/2012 | Fehr et al. ..................... 713/500 |
| 2012/0082267 A1 * | 4/2012 | Kao .............................. 375/317 |

OTHER PUBLICATIONS

U.S. Appl. No. 12/894,745, filed Sep. 30, 2010.*

* cited by examiner

*Primary Examiner* — Phuong Phu
(74) *Attorney, Agent, or Firm* — Muncy, Geissler, Olds & Lowe, PLLC

(57) ABSTRACT

A communication receiver and a receiving method are disclosed. An analog front-end device samples a receiving signal and generates a sampled signal. A signal detector detects presence of the receiving signal according to the sampled signal. A symbol timing recovery (STR) unit determines an optimal symbol sampling point according to a zero-crossing point of the sampled signal when the receiving signal is present, and then generates a recovered symbol based on an optimally chosen sampled value according to the optimal symbol sampling point.

21 Claims, 7 Drawing Sheets

```
I  :  0  1  ②  3  4
II :  1  2  ③  4  0
III:  2  3  ④  0  1
IV :  3  4  ⓪  1  2
V  :  4  0  ①  2  3
```

COMMUNICATION RECEIVER AND A RECEIVING METHOD

BACKGROUND OF THE INVENTION

1. Field of the Invention

The present invention generally relates to a communication network, and more particularly to a communication receiver and a communication receiving method.

2. Description of Related Art

Ethernet is a computer networking technique that is widely used in constructing a local area network. 10BASE-TX, for example, is specified in IEEE 802.3 and can transfer data at a nominal rate of 10 Mbit/sec. Data is transferred over an unshielded twisted-pair (UPT) cable with a specified length.

FIG. 1 shows a representative waveform of a frame structure of Ethernet over twisted pair running at 10 Mbit/sec (or 10BASE-T). A frame is separated from other packets by silence signal, during which no transactions occur. Each frame includes four parts: a preamble, a start of frame delimiter (SFD), data and an end of transmission delimiter (ETD). The preamble commonly includes a pattern alternated with "0" and "1," which are used for the purpose of synchronizing a receiver. At the end of the preamble is the SFD, which includes a specific pattern (e.g., 10101101 as shown in FIG. 1) that is used to determine the beginning of the data. Following the data is the ETD (e.g., a predetermined period of high level before returning back to zero level) that is used to indicate the ending of the frame.

However, the frequency and phase of a received signal's carrier are commonly deviated from those of local oscillator. Moreover, as the UPT cable length is expanded, aged or disposed in a noisy environment, the received signal at the receiver side may probably be decayed or have lower signal-to-noise ratio (SNR). As a result, the received signal at the receiver side may probably be decayed or have lower signal-to-noise ratio (SNR), therefore increasing data error or reducing detection ratio.

For the reason that the conventional Ethernet receiver could not effectively receive data in a noisy environment, a need has arisen to propose a novel scheme for recovering a symbol from the received signal.

SUMMARY OF THE INVENTION

In view of the foregoing, it is an object of the embodiment of the present invention to provide a reliable symbol timing recovering scheme in a communication receiver for the purpose of correctly and reliably recovering a corresponding symbol of a transmitted signal.

According to one embodiment, a communication receiver includes an analog front-end device, a signal detector and a symbol timing recovery (STR) unit. Specifically, the analog front-end device is configured to sample a receiving signal and generate a sampled signal. The signal detector is configured to detect presence of the receiving signal according to the sampled signal. The STR unit is configured to determine an optimal symbol sampling point according to a zero-crossing point of the sampled signal when the receiving signal is present, and then generate a recovered symbol based on an optimally chosen sampled value according to the optimal symbol sampling point.

DETAILED DESCRIPTION OF THE INVENTION

Figure 1:
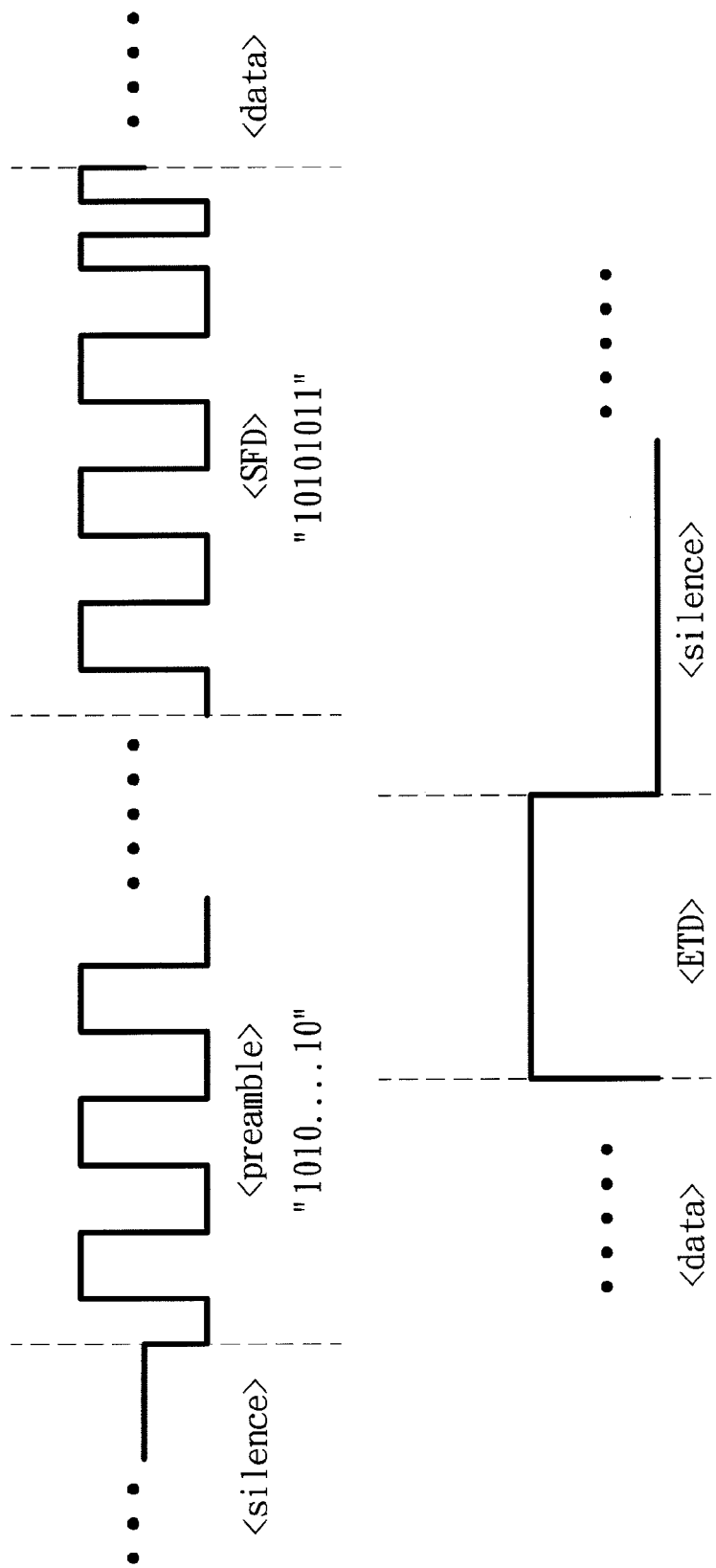
FIG. 1 shows a representative waveform of a frame structure of Ethernet over twisted pair.
Figure 2A:
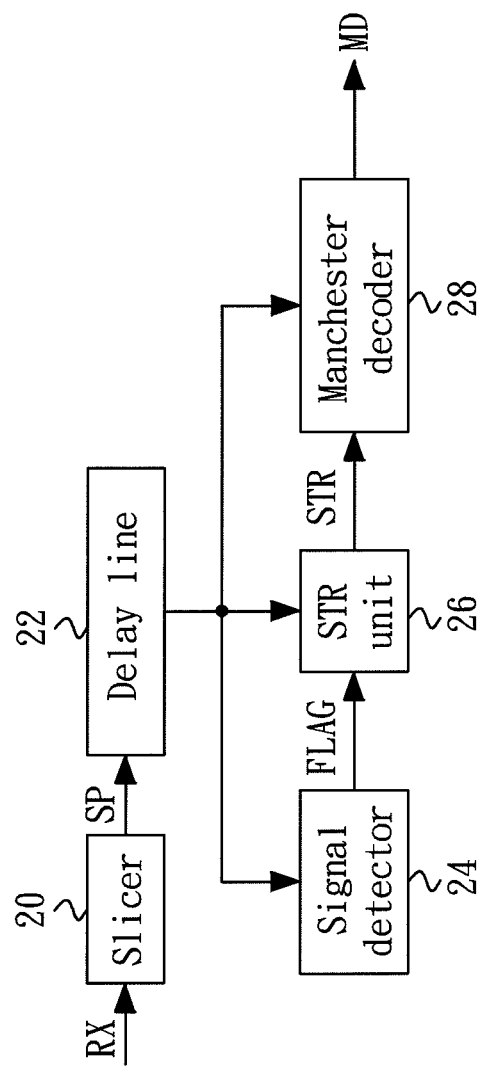
FIG. 2A shows a block diagram illustrative of a communication receiver according to one embodiment of the present invention.
Figure 2B:
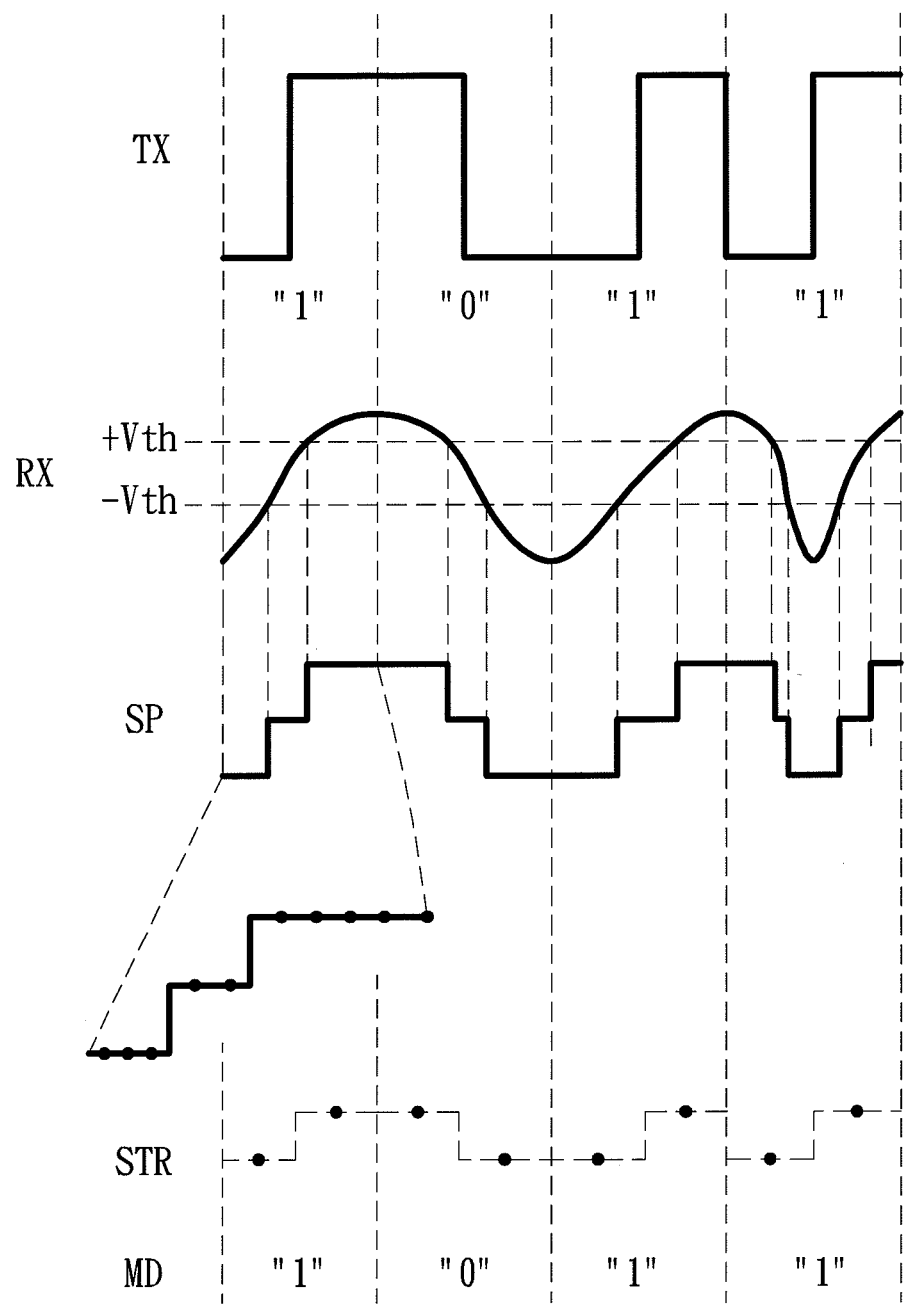
FIG. 2B shows waveforms of some pertinent signals in the illustrated communication receiver of FIG. 2A.

FIG. 2A shows a block diagram illustrative of a communication receiver according to one embodiment of the present invention. Although Ethernet over twisted pair running at 10 Mbit/sec (or 10BASE-T) is adopted in the embodiment, it is appreciated by those skilled in the pertinent art that the present embodiment may be adapted to other communication receiver that adopts Manchester coding or the like in which each symbol has at least one transition. FIG. 2B shows waveforms of some pertinent signals in the illustrated communication receiver of FIG. 2A.

As shown in FIG. 2B, a transmitting signal TX adopts Manchester coding, in which each symbol (or bit) has at least one transition. For example, a bit "1" is represented by low-to-high transition, and a bit "0" is represented by high-to-low transition. It is observed that a bit "1" and a following bit "0" result in a positive wide pulse having a width of 100 ns or symbol period. Similarly, a bit "0" and a following bit "1" result in a negative wide pulse having a width of 100 ns. On the other hand, a bit "1" followed by a bit "1" results in a positive narrow pulse having a width of 50 ns or a half symbol period. Similarly, a bit "0" followed by a bit "0" (not shown in the figure) results in a negative narrow pulse having a width of 50 ns.

In the embodiment, an analog front-end device such as a slicer (or a squelch device) 20 samples a receiving signal RX as exemplified in FIG. 2B and accordingly generates a multi-level (e.g., 1, 0 and −1) sampled signal SP that may be stored in a storage device such as a delay line 22. Specifically, the slicer 20 maps a sampled value greater than a positive threshold +Vth to "1", a sampled value less than a negative threshold −Vth to "−1", and to "0" otherwise. As illustrated in an enlarged view of a sampled symbol shown in FIG. 2B, ten samples are generated per symbol according to 10BASE. Accordingly, the sampling rate of the slicer 20 is 100 Mbit/sec.

Subsequently, a signal detector 24 detects the presence of the 10BASE receiving signal RX according to the sampled signal stored in the delay line 22. An asserted flag FLAG will be generated when the 10BASE receiving signal is present, otherwise a non-asserted flag FLAG will be generated. A detailed flow illustrative of the operation of the signal detector 24 will be described later in this specification. In a further embodiment, an auto-negotiation session will be performed when the flag toggles between the assertion and non-assertion at a frequency exceeding a predetermined value, indicative of an incorrect speed mode.

Afterwards, a symbol timing recovery (STR) unit 26 determines an optimal symbol sampling point according to a zero-crossing point of the sampled signal stored in the delay line 22 when the flag FLAG of the signal detector 24 is asserted. As illustrated in FIG. 2B, the STR unit 26 generates a recovered symbol STR based on the optimally chosen sampled value according to the optimal symbol sampling point. As a result, the sampling rate is reduced from 100 Mbit/sec to 20 Mbit/sec. A detailed flow illustrated the operation of the STR unit 26 will be described later in the specification.

Finally, a decoder such as a Manchester decoder 28 decodes the recovered symbol STR into a decoded symbol MD that has a symbol rate of 10 Mbit/sec and may recover a corresponding symbol of the transmitting signal TX.

Figure 3:
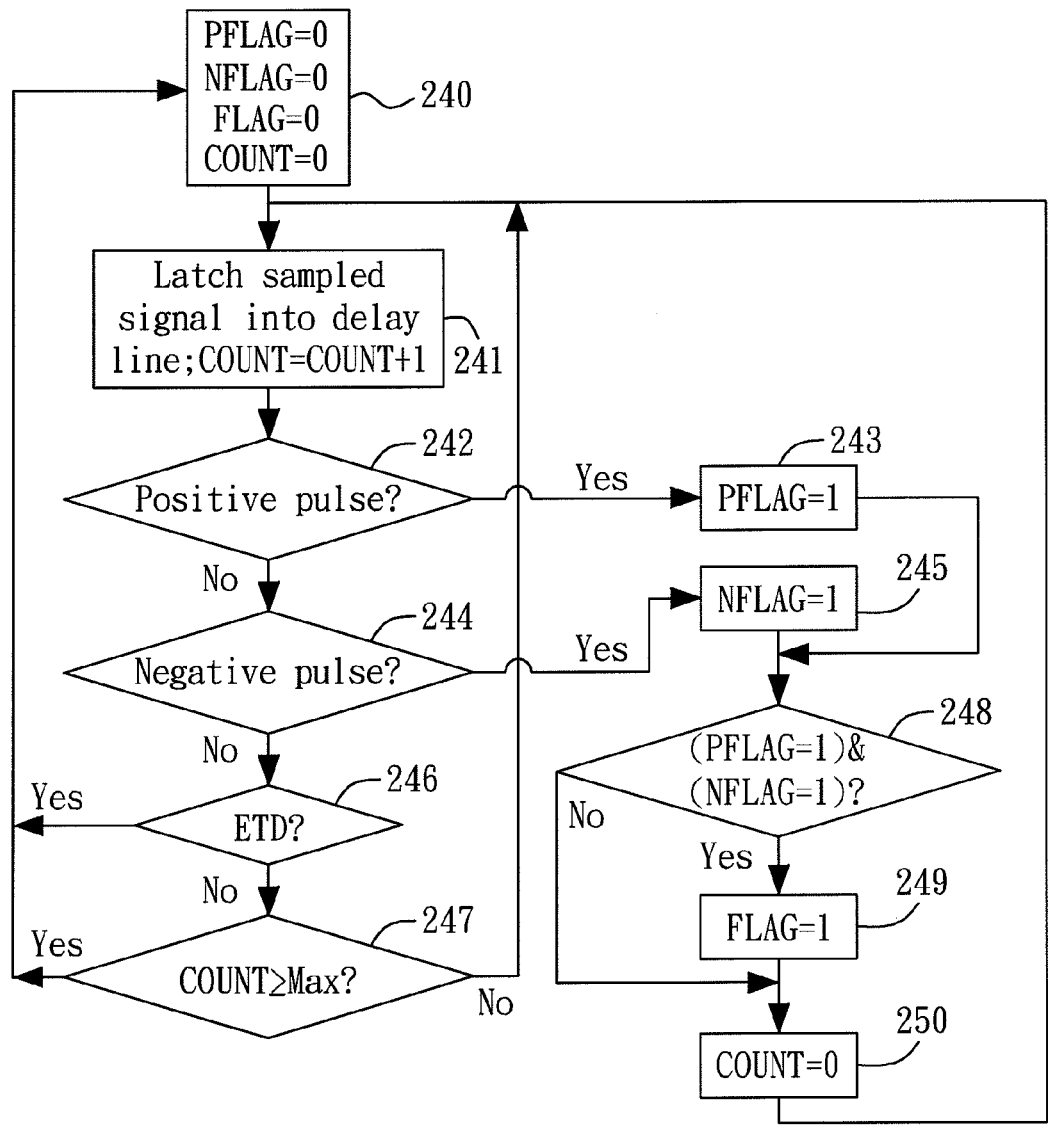
FIG. 3 shows a flow diagram of the signal detector of FIG. 2A according to one embodiment of the present invention.

FIG. 3 shows a flow diagram of the signal detector 24 according to one embodiment of the present invention. In step 240, some parameters are initialized. Specifically, a positive-pulse flag PFLAG is used to denote the presence of a positive wide/narrow pulse as described above; a negative-pulse flag NFLAG is used to denote the presence of a negative wide/narrow pulse as described above; a composite flag FLAG is used to denote occurrence of both the positive wide/narrow pulse and the negative wide/narrow pulse; and a counting value COUNT of a counter is used to keep a count of iterations.

In step 241, a sampled signal SP is latched into the delay line 22, and the counting value COUNT is incremented. The latched sampled signal SP is checked, in step 242, whether a positive wide/narrow pulse occurs. If a positive wide/narrow pulse occurs, the positive-pulse flag PFLAG is asserted (e.g., set to "1") in step 243. Otherwise, the latched sampled signal SP is further checked, in step 244, whether a negative wide/narrow pulse occurs. If a negative wide/narrow pulse occurs, the negative-pulse flag NFLAG is asserted (e.g., set to "1") in step 245. If neither the positive wide/narrow pulse nor the negative wide/narrow pulse occurs, the latched sampled signal SP is checked, in step 246, whether an end-of-transmission delimiter ETD occurs, indicative of the end of a packet. If the end-of-transmission delimiter ETD occurs, the flow restarts from the beginning step 240. Otherwise, further sampled signal SP is latched into the delay line 22 (step 241) until the counting value COUNT reaches a predetermined maximum value (step 247), at that time, the flow restarts from the beginning step 240.

In the embodiment, when both the positive-pulse flag PFLAG and the negative-pulse flag NFLAG are asserted (step 248), the composite flag FLAG is then asserted in step 249, followed by resetting the counting value COUNT in step 250 and renewing a new session of iterations.

Figure 4A:
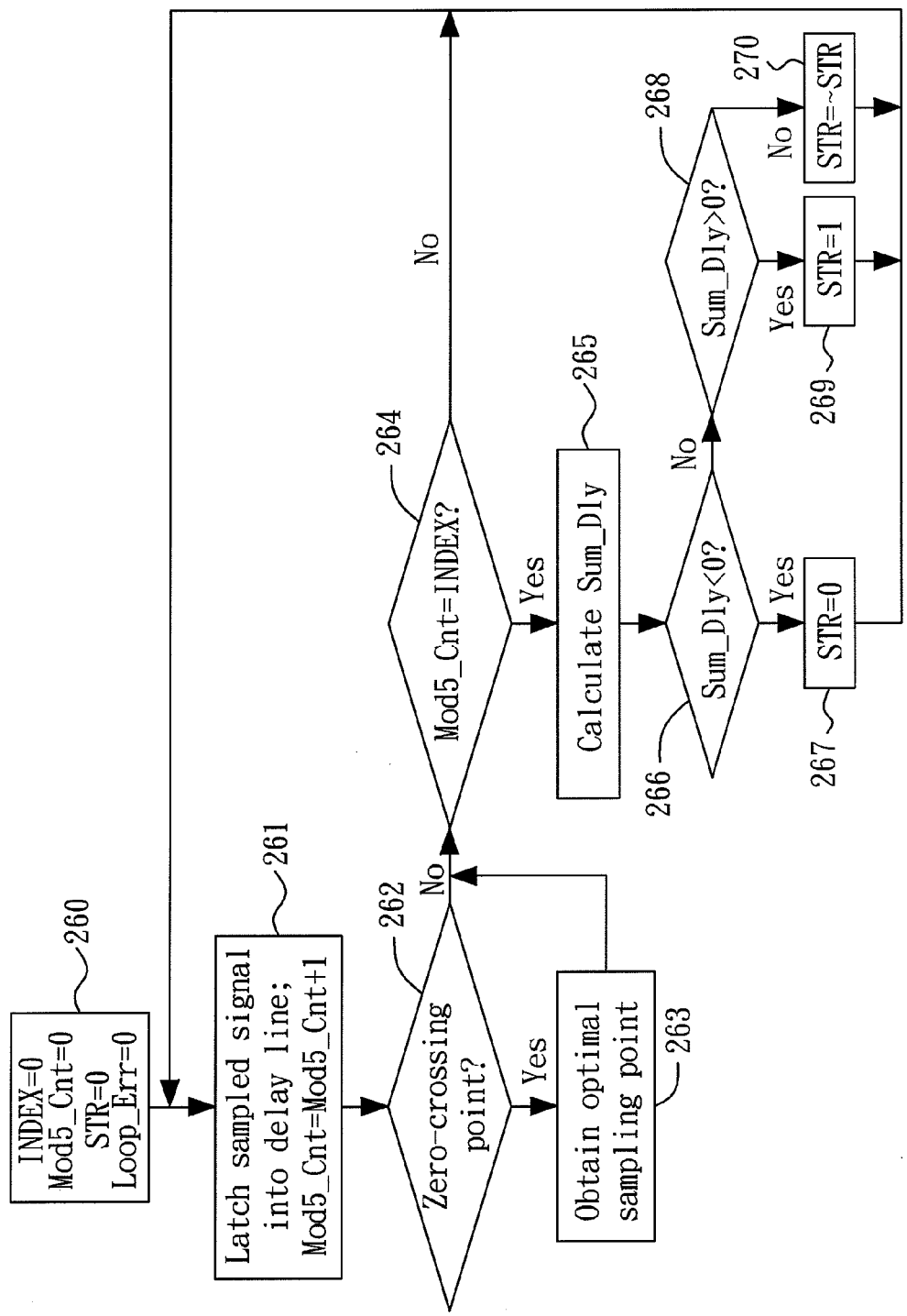
FIG. 4A shows a flow diagram of the symbol timing recovery (STR) unit of FIG. 2A according to one embodiment of the present invention.

FIG. 4A shows a flow diagram of the symbol timing recovery (STR) unit 26 according to one embodiment of the present invention. In step 260, some parameters are initialized. Specifically, a free-run counting value Mod5_Cnt of a free-run counter with modulo 5 is used to denote sequence of the sampled signal stored in the delay line 22. As five samples are generated per half symbol according to 10BASE, the modulo 5 is used in the embodiment to make the free-run counter count from 0 to 4 in order within a half symbol duration. An index INDEX is used to denote an optimal symbol sampling point associated with the counting value Mod5_Cnt. An error parameter Loop_Err is used to denote error between the counting value Mod5_Cnt and the index INDEX, and the variable STR is used to denote the recovered symbol from the STR unit 26.

In step 261, a sampled signal SP is latched into the delay line 22, and the counting value Mod5_Cnt is incremented. The latched sampled signal SP is detected, in step 262, whether a zero-crossing point occurs. If the zero-crossing point occurs, an optimal sampling point denoted by the index INDEX is obtained in step 263 according to the difference between the counting value Mod5_Cnt and the index INDEX.

Figure 4B:
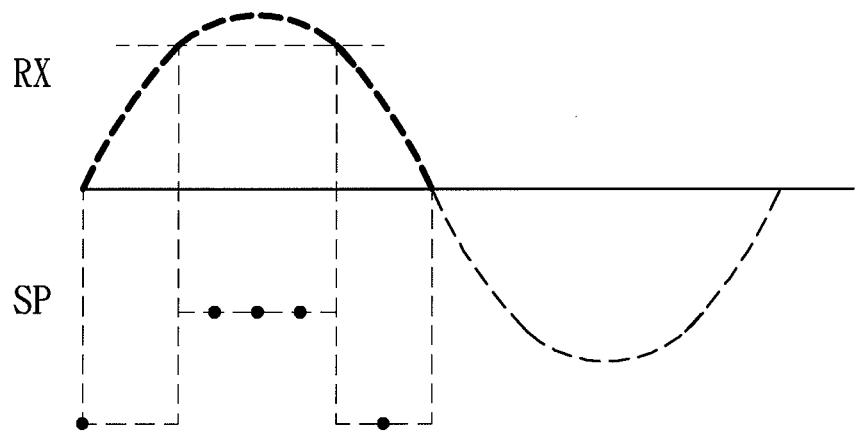
FIG. 4B shows an exemplary receiving signal and a corresponding half symbol of the sampled signal.

FIG. 4B shows an exemplary receiving signal RX and a corresponding half symbol of the sampled signal SP. Five possible cases of Mod5_Cnt sequences I to V are also shown with a circled value denoting the obtained index INDEX. For example, in case I, the counting value Mod5_Cnt at the zero-crossing point is "0" and the corresponding index INDEX 2 denotes the optimal sampling point. In case II, the counting value Mod5_Cnt at the zero-crossing point is "1" and the corresponding index INDEX 3 obtained in step 263 denotes the modified optimal sampling point. A detailed flow illustrative of step 263 will be described later in this specification.

Referring back to the flow of FIG. 4A, step 261 is repeatedly performed until the counting value Mod5_Cnt is equal to the index INDEX in step 264, indicating that the latched sampled signal SP is currently located at the optimal sampling point. Subsequently, in step 265, at least one preceding sample value and one succeeding sample value of the sampled signal SP are summed up with the current sample value to result in a sum value Sum_Dly. If the sum value Sum_Dly is determined, in step 266, to be less than zero, indicative of a strong recovered symbol "−1", the STR unit 26 then outputs "0" as the recovered symbol STR (step 267). If the sum value Sum_Dly is determined, in step 268, to be greater than zero, indicative of a strong recovered symbol "1", the STR unit 26 then outputs "1" as the recovered symbol STR (step 269). If the sum value Sum_Dly is neither greater nor less than zero (i.e., is equal to zero), for example, a sum of −1, 0, 1 or a sum of 0, 0, 0, indicative of a weak recovered symbol, the STR unit 26 thus outputs a recovered symbol STR that is reversed to the previous recovered symbol STR (step 270).

Figure 4C:
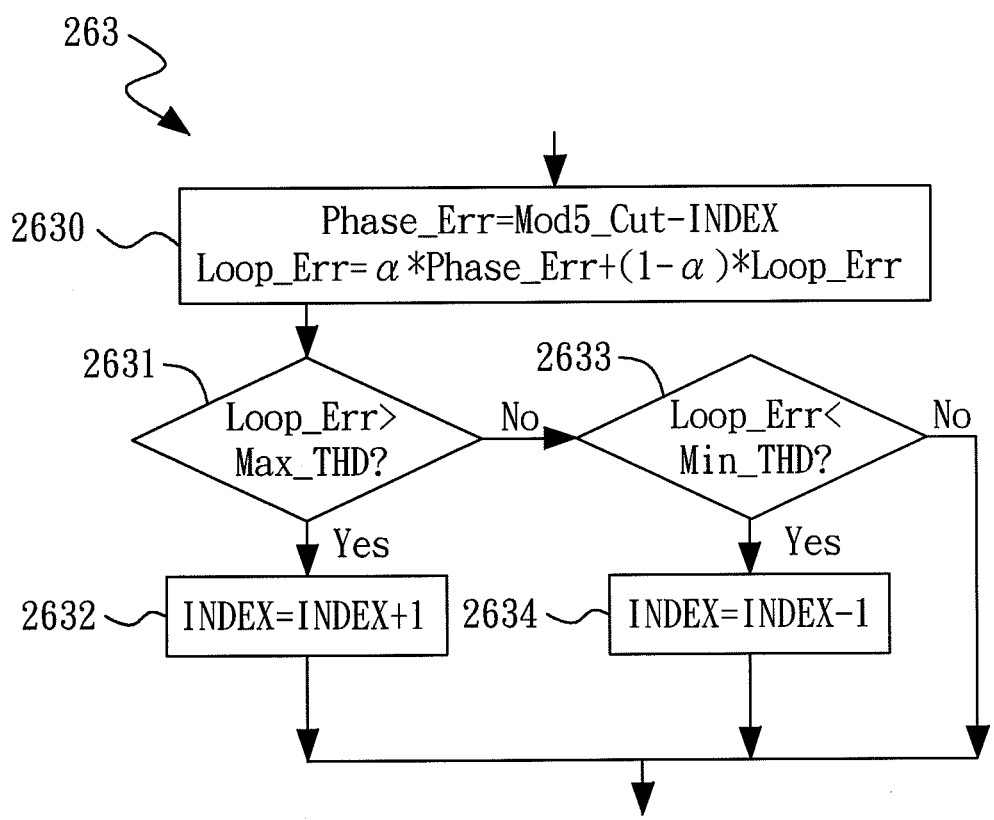
FIG. 4C shows a detailed flow illustrative of step 263 in FIG. 4A.

FIG. 4C shows a detailed flow illustrative of step 263 in FIG. 4A. In step 2630, the difference between the counting value Mod5_Cnt and the index INDEX is denoted by Phase_Err, and the error parameter Loop_Err is updated according to Phase_Err.

When the error parameter Loop_Err is greater than a predetermined maximum threshold Max_THD in step 2631, indicating that the index INDEX substantially falls behind the counting value Mod5_Cnt, the index INDEX is thus incremented in step 2632. On the other hand, when the error parameter Loop_Err is less than a predetermined minimum threshold Min_THD in step 2633, indicating that the index INDEX substantially goes ahead the counting value Mod5_Cnt, the index INDEX is thus decremented in step 2634.

Although specific embodiments have been illustrated and described, it will be appreciated by those skilled in the art that various modifications may be made without departing from the scope of the present invention, which is intended to be limited solely by the appended claims.

What is claimed is:

1. A communication receiver, comprising:
   an analog front-end device configured to sample a receiving signal and generate a sampled signal;
   a signal detector configured to detect presence of the receiving signal according to the sampled signal; and
   a symbol timing recovery (STR) unit configured to determine an optimal symbol sampling point according to a zero-crossing point of the sampled signal when the receiving signal is present, the STR unit generating a recovered symbol based on an optimally chosen sampled value according to the optimal symbol sampling point;
   wherein the analog front-end device is a slicer configured to map a sampled value of the receiving signal to the sampled signal having multiple levels.

2. The communication receiver of claim 1, wherein the slicer is configured to map a sampled value of the receiving signal greater than a positive threshold to "1", the sampled value less than a negative threshold to "−1", and to "0" otherwise.

3. The communication receiver of claim 1, wherein the signal detector generates an asserted flag when the receiving signal is present, otherwise generates a non-asserted flag.

4. The communication receiver of claim 3, wherein the signal detector initiates an auto-negotiation session when the flag toggles between assertion and non-assertion at a frequency exceeding a predetermined value.

5. The communication receiver of claim 3, wherein the signal detector outputs the asserted flag when both a positive pulse and a negative pulse are detected.

6. The communication receiver of claim 5, wherein the positive pulse is either a positive wide pulse having a width of a symbol period or a positive narrow pulse having a width of a half symbol period; and the negative pulse is either a negative wide pulse having a width of the symbol period or a negative narrow pulse having a width of the half symbol period.

7. The communication receiver of claim 1, further comprising:
    a decoder configured to decode the recovered symbol into a decoded symbol.

8. The communication receiver of claim 7, wherein the decoder is a Manchester decoder that adopts Manchester coding, in which each data bit has at least one transition.

9. The communication receiver of claim 1, wherein the STR unit comprises a free-run counter configured to denote sequence of the sampled signal in order within a half symbol duration.

10. The communication receiver of claim 1, further comprising a storage device configured to store the sampled signal.

11. A communication receiving method implemented in a receiver, comprising:
    sampling a receiving signal to generate a sampled signal;
    detecting presence of the receiving signal according to the sampled signal;
    determining an optimal symbol sampling point according to a zero-crossing point of the sampled signal when the receiving signal is present; and
    generating a recovered symbol based on an optimally chosen sampled value according to the optimal symbol sampling point;
    wherein the sampled signal has multiple levels and is generated by mapping a sampled value of the receiving signal.

12. The method of claim 11, wherein the sampled signal is generated by mapping a sampled value of the receiving signal greater than a positive threshold to "1", the sampled value less than a negative threshold to "−1", and to "0" otherwise.

13. The method of claim 11, further comprising a step of generating an asserted flag when the receiving signal is present, otherwise generating a non-asserted flag.

14. The method of claim 13, further comprising a step of performing an auto-negotiation session when the flag toggles between assertion and non-assertion at a frequency exceeding a predetermined value.

15. The method of claim 13, wherein the flag is asserted when both a positive pulse and a negative pulse are detected.

16. The method of claim 15, wherein the positive pulse is either a positive wide pulse having a width of a symbol period or a positive narrow pulse having a width of a half symbol period; and the negative pulse is either a negative wide pulse having a width of the symbol period or a negative narrow pulse having a width of the half symbol period.

17. The method of claim 11, further comprising a step of decoding the recovered symbol into a decoded symbol.

18. The method of claim 17, wherein the decoding step adopts Manchester coding, in which each data bit has at least one transition.

19. The method of claim 11, further comprising a step of storing the sampled signal.

20. The method of claim 11, wherein the optimal sampling point is determined, when a zero-crossing point is detected, according to difference between a free-run counting value and an index, wherein the free-run counting value denotes sequence of the sampled signal in order within a half symbol duration, and the index denotes the optimal symbol sampling point associated with the free-run counting value.

21. The method of claim 20, wherein the step of generating the recovered symbol comprises:
    summing up at least one preceding sample value and at least one succeeding sample value of the sampled signal with a current sample value when the free-run counting value is equal to the index, thereby resulting in a sum value;
    outputting "0" as the recovered symbol when the sum value is less than zero;
    outputting "1" as the recovered symbol when the sum value is greater than zero; and
    outputting a reversed recovered symbol that is reversed to the previous recovered symbol when the sum value is equal to zero.

* * * * *